United States Patent [19]
Amin

[11] Patent Number: 6,167,261
[45] Date of Patent: *Dec. 26, 2000

[54] WIRELESS COMMUNICATION SERVICE MANAGEMENT

[75] Inventor: Umesh J. Amin, Redmond, Wash.

[73] Assignee: AT&T Wireless Svcs. Inc., Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,959

[22] Filed: Feb. 27, 1997

[51] Int. Cl.$^7$ ...................................................... H04Q 7/24
[52] U.S. Cl. .......................... 455/426; 455/422; 455/403
[58] Field of Search .................................. 455/461, 426, 455/422, 417, 403, 550, 412, 414; 379/56, 57, 58, 207, 211, 212; 370/289

[56] References Cited

U.S. PATENT DOCUMENTS

| | | | |
|---|---|---|---|
| 5,155,742 | 10/1992 | Ariyavisitakul et al. | 375/13 |
| 5,247,571 | 9/1993 | Kay et al. | 379/207 |
| 5,278,890 | 1/1994 | Beeson, Jr. et al. | 379/57 |
| 5,327,486 | 7/1994 | Wolff et al. | 379/96 |
| 5,329,578 | 7/1994 | Brennan et al. | 379/67 |
| 5,396,539 | 3/1995 | Slekys et al. | 379/59 |
| 5,420,911 | 5/1995 | Dahlin et al. | 379/59 |
| 5,428,815 | 6/1995 | Grube | 455/33.1 |
| 5,457,680 | 10/1995 | Kamm et al. | 370/17 |
| 5,483,669 | 1/1996 | Barnett et al. | 455/33.2 |
| 5,487,101 | 1/1996 | Fletcher | 379/59 |
| 5,502,721 | 3/1996 | Pohjakallio | 370/60.1 |
| 5,511,111 | 4/1996 | Serbetcioglu et al. | 379/67 |
| 5,517,562 | 5/1996 | McConnell | 379/207 |
| 5,546,444 | 8/1996 | Roach, Jr. et al. | 379/59 |
| 5,546,574 | 8/1996 | Grosskopf et al. | 395/600 |
| 5,550,907 | 8/1996 | Carlsen | 379/207 |
| 5,572,579 | 11/1996 | Orriss et al. | 379/142 |
| 5,608,786 | 3/1997 | Gorden | 379/100 |
| 5,727,057 | 3/1998 | Emery et al. | 379/211 |
| 5,742,668 | 4/1998 | Pepe et al. | 379/58 |
| 5,742,905 | 4/1998 | Pepe et al. | 455/461 |
| 5,761,288 | 6/1998 | Pinard et al. | 379/201 |
| 5,793,762 | 8/1998 | Penners et al. | 370/389 |

FOREIGN PATENT DOCUMENTS

| | | |
|---|---|---|
| 0 505 106 A2 | 9/1992 | European Pat. Off. . |
| 0 685 972 A3 | 12/1995 | European Pat. Off. . |
| 0 690 640 A2 | 1/1996 | European Pat. Off. . |

*Primary Examiner*—Daniel S. Hunter
*Assistant Examiner*—Pablo N. Tran

[57] ABSTRACT

Network resources associated with a wireless communication network are assigned to a wireless communication device in accordance with its device type and required service type. A profile is associated with each wireless communication device, and includes a travelling class mark field which identifies the device type of the wireless communication device, and a service class mark field which identifies the required service for the wireless communication device. Different wireless communication devices are accommodated via different profiles. The profiles are permanently stored at a service control point which is accessible to a plurality of mobile service centers.

21 Claims, 2 Drawing Sheets

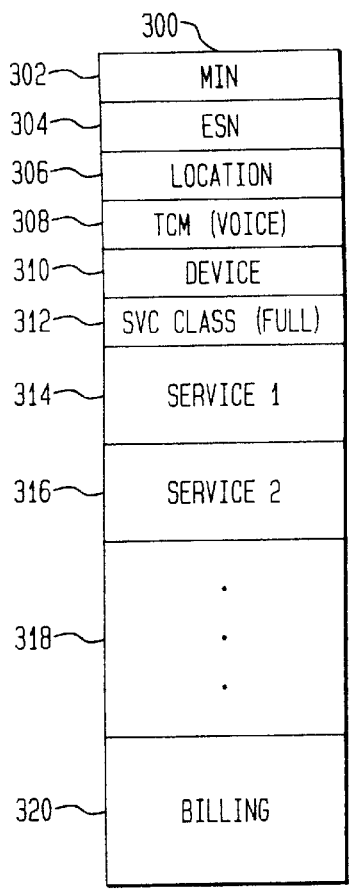
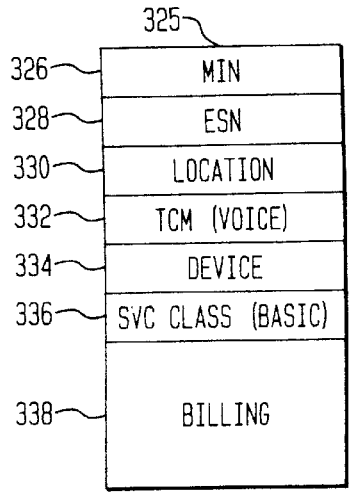
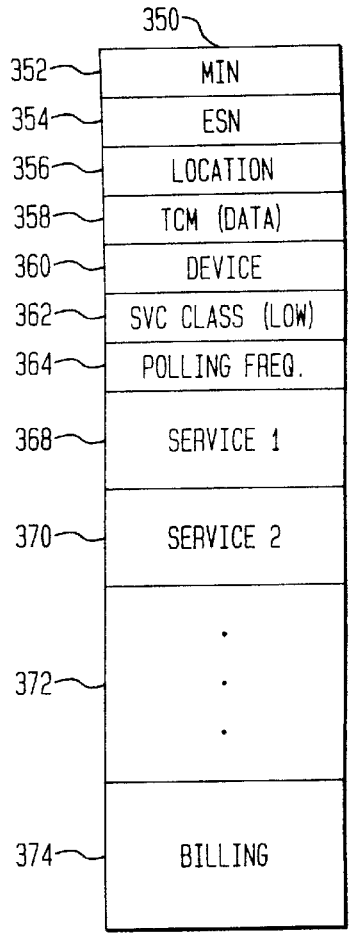
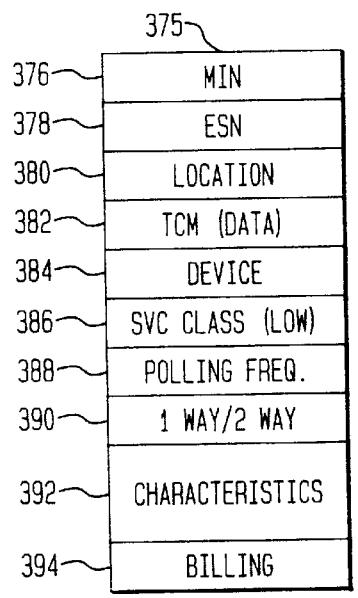

WIRELESS COMMUNICATION SERVICE MANAGEMENT

The present invention relates to wireless communications, and, more specifically, is directed to managing the resources of a wireless communication network to efficiently accommodate different types of wireless communication devices and associated services.

BACKGROUND OF THE INVENTION

FIG. 1 shows a conventional wireless communication service configuration. Mobile service center (MSC) 100 communicates via base stations 120, 122, 124 with a community of wireless telephones 150. MSC 100 also communicates with public switched telephone network (PSTN) 170 so that wireless telephones 150 can place calls to and receive calls from conventional wireline telephones (not shown). MSC 100 includes processor 102, home location register (HLR) 104, visitor location register (VLR) 106, PSTN interface 108, base station communications interface 110 and network interface 112. HLR 104 and VLR 106 comprise computer memory and/or storage devices. MSC 100 also includes additional computer memory and/or storage devices for use by processor 102, but not shown.

HLR 104 is adapted to store profiles for wireless telephones 150 permanently associated therewith. That is, when a user signs up for wireless communication service with a service provider, the service provider creates a data record in MSC 100 for the user, referred to as a profile and stored in HLR 104, containing descriptive and billing information for the wireless communication device, and wireless communication service for the wireless communication device. When the user uses the wireless communication service in the area served by MSC 100, the profile in HLR 104 is accessed.

When a user of a wireless telephone with a profile not stored in HLR 104, referred to as a visiting user, attempts to use wireless communication service from MSC 100, MSC 100 creates a data record in VLR 106 for the user. MSC 100 has a list of areas codes and exchanges identifying the home mobile switch number for a visitor presenting a particular area code and exchange, uses this list to obtain the home mobile switch number for the visiting user, and then converts the home mobile switch number to a HLR address associated with the visiting user. Via communications network 180 coupled to network interface 112, MSC 100 requests the profile for the visiting user telephone from the HLR associated therewith. MSC 190 is shown as representing a plurality of MSCs which are accessible to MSC 100 via communications network 180 which may be, for example, the AT&T SS7 switching network.

The profile for the visiting user is stored in VLR 106 while the visiting user is in the area served by MSC 100. When the visiting user leaves the area served by MSC 100, MSC 100 deletes the profile from VLR 106.

The data records for the profiles have a fixed size for accommodating users who have signed up for a variety of enhanced communication features, such as call forwarding, call screening, multi-party calling, caller ID, message waiting, blocking priority and so on. Since the fixed size is a large number of bytes, such as 1000 bytes per profile, MSC 100 is limited in the number of wireless telephones it can serve by profile memory requirements. In general, users are allocated similar amounts of wireless communication network resources, which becomes more inefficient as the variety of available services increases.

SUMMARY OF THE INVENTION

In accordance with the present invention, network resources associated with a wireless communication network are managed by ascertaining, for a wireless communication device, a device type and a required service; and assigning the network resources to the wireless communication device in accordance with the device type and the required service.

A profile is associated with the wireless communication device. The profile includes a travelling class mark field which identifies the device type of the wireless communication device, and a service class mark field which identifies the required service for the wireless communication device.

Also, in accordance with the present invention, a method and a service control point for managing resources in a wireless communication network are provided. A profile for a wireless communication device is stored in a service control point, and the profile for the wireless communication device is provided in response to a profile request from a mobile service center.

Further, in accordance with the present invention, a method and a mobile service center (MSC) for obtaining information about a wireless communication device and wireless communication service for the wireless communication device are provided. The MSC determines that the wireless communication device is in the area served by the MSC, and the MSC requests, via a communication network, a profile for the wireless communication device from a service control point which permanently stores the profile. In the present invention, the MSC has no wireless communication devices permanently associated therewith.

It is not intended that the invention be summarized here in its entirety. Rather, further features, aspects and advantages of the invention are set forth in or are apparent from the following description and drawings, in which like elements in different drawings are indicated by the same reference numeral.

LIST OF FIGURES

FIGS. 3A–3D are charts representing profiles according to the present inventive technique.

DETAILED DESCRIPTION OF PREFERRED EMBODIMENTS

According to the present inventive technique, wireless communication network resources are assigned to wireless communication devices based on the type of device and the type of service required. By tailoring resource assignment in this manner, resources are used more efficiently, and the wireless communication network can more readily support a large variety of devices. As used herein and in the claims, "network resources" refers to resources other than customer premises equipment, for example, voice/data channels, memory in non-customer premises equipment, radio frequency bandwidth and so on.

Figure 1:
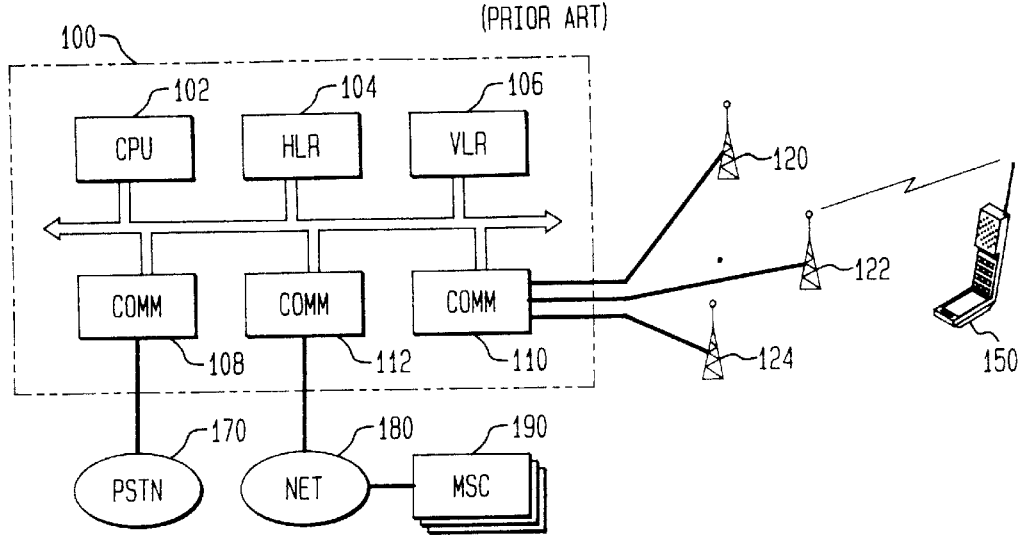
FIG. 1 is a block diagram of a conventional wireless communication service configuration.
Figure 2:
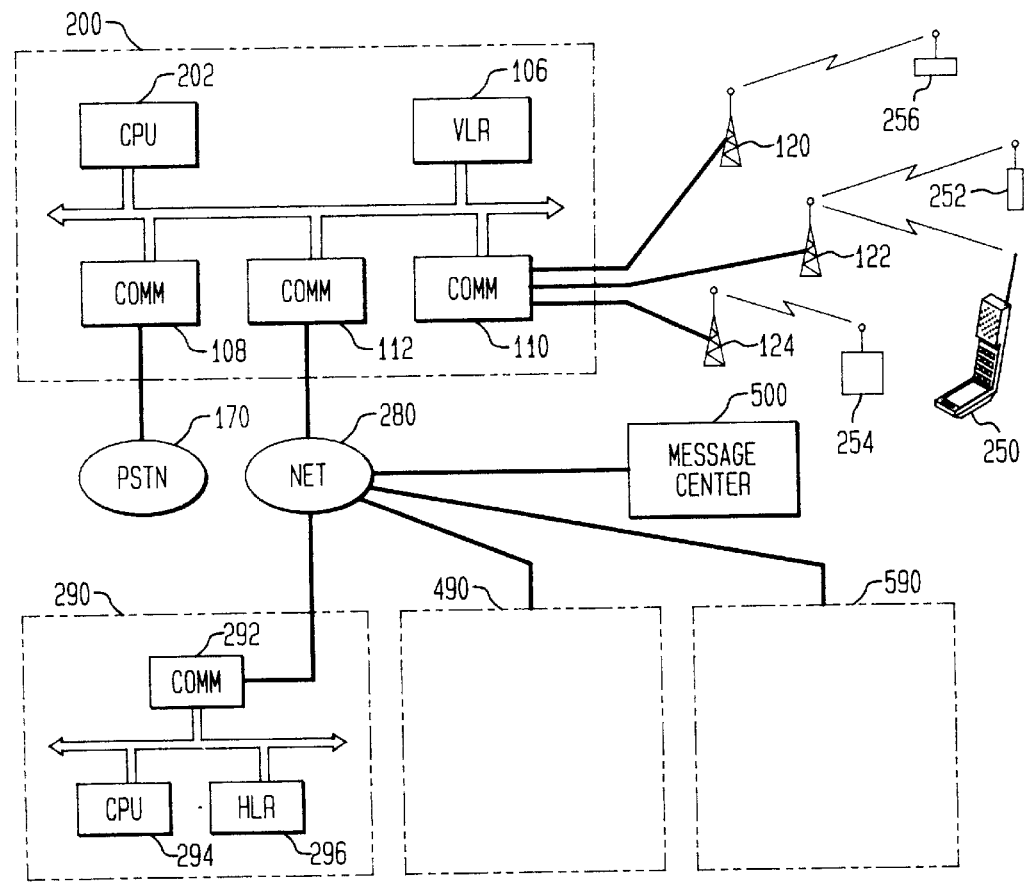
FIG. 2 is a block diagram of a wireless communication service configuration in which the present inventive technique may be applied.

FIG. 2 shows a wireless communication service configuration in which the present inventive technique may be applied. MSC 200 is generally similar to MSC 100, except that MSC 200 lacks a HLR, and consequently has substantially no subscriber profiles permanently associated therewith. Consequently, the storage capacity of MSC 200 does not limit the number of devices permanently associated therewith. Also, MSC 200 does not directly communicate with other MSCs as does MSC 100 of FIG. 1. Processor 202 of FIG. 2 is generally similar to processor 102 of FIG. 1, but is operative according to the present inventive technique. Network 280 of FIG. 2 is generally similar to network 180 of FIG. 1, but has different connections.

FIG. 2 also shows service control points (SCPs) 290, 490, 590. Each of SCP 290, 490, 590 includes hardware such as communications interface 292, processor 294 and home location register (HLR) 296. Each of SCPs 290, 490, 590 is separate from MSC 200. As explained further below, each of SCP 290, 490, 590 is adapted to permanently store profiles for respectively different types of wireless communication devices. A wireless communication device may be permanently associated with MSC 200 through a profile stored in one of SCP 290, 490, 590. In the present embodiment, SCP 290 accommodates profiles for voice and data wireless devices, SCP 490 accommodates profiles for data-only wireless devices and SCP 590 accommodates profiles for messaging-only wireless devices, such as pagers.

It will be appreciated that, while FIG. 2 shows physically separate SCPs 290, 490, 590, in other embodiments, SCPs 290, 490, 590 may be co-located in one processor, with data for respective types of profiles logically stored together.

FIG. 2 additionally shows full service wireless telephone 250 which may have one or more enhanced communication features such as call forwarding and call screening associated therewith, basic service wireless telephone 252 having no enhanced communication features associated therewith, i.e., having only plain old telephone service (POTS) associated therewith, wireless dataphone 254 which may be, for example, a personal computer or a telemetry device (e.g., usage meter), and pager 256. It is assumed that the user of basic service wireless telephone 252 has signed up for a basic grade of service, possibly including a communication channel of less than wireline voicegrade quality, such as would be appropriate for a car telephone used only in emergencies.

FIG. 2 further shows message center 500 for providing respective mailboxes for wireless communication devices having profiles stored in SCPs 290, 490, 590 and subscribing to a service employing a mailbox. The most common type of mailbox is a voice mailbox, wherein callers leave voice signals for subsequent replay by the mailbox owner. However, in accordance with the TCM and SCM of the device associated with the mailbox, message center 500 adapts the mailbox for storing text and video, in addition to or instead of voice.

When a device attempts to use a wireless communication service provided by MSC 200, MSC 200 prepares a request for the profile of the device, and sends it to network 280 for transmission. When SCPs 290, 490, 590 are co-located, the request is sent to such location. When SCPs 290, 490, 590 are in separate locations, several scenarios are contemplated.

In one scenario, the wireless communication device stores within itself device type identification sufficient to enable MSC 200 to determine to which of SCPs 290, 490, 590 the profile request should be sent. When the device attempts to register with MSC 200, the device provides its identification information to MSC 200.

In another scenario, there is a registry SCP (not shown) coupled to network 280. The profile request is first sent to the registry SCP, which serves to look up the serving SCP for the wireless communication device of the profile request. The registry SCP then forwards the profile request to the serving SCP using network 280. The serving SCP sends the requested profile to MSC 200 along with information identifying itself as the serving SCP.

Since MSC 200 requests profiles for all devices, it is desirable to reduce the size of a profile so as to minimize usage of network 280. Some enhanced communication features, such as "wireless office" (four digit dialing from anywhere in the country), fraud protection (two stage dialing including locking and unlocking of communication service), message waiting and authentication (a communication device requesting service must automatically respond with a predetermined digit sequence), may require multiple interactions between MSC 200 and the serving SCP, further motivating reduction in the length of data that must be exchanged therebetween.

Since each of SCPs 290, 490, 590 may have millions of profiles permanently associated therewith, it is desirable to reduce the size of a profile so as to minimize the amount of storage required per user.

According to the present inventive technique, different wireless communication devices are allocated different amounts of network resources in accordance with descriptive information in their respective profiles, resulting in more efficient use of storage and communication facilities than if resources are uniformly allocated among devices. Each profile includes a travelling class mark (TCM) identifying the type of the profile and the type of the device, and a service class mark (SCM) identifying the types of services associated with the wireless communication device.

FIGS. 3A–3D show profiles 300, 325, 350, 375 for full service wireless telephone 250, basic service wireless telephone 252, wireless dataphone 254, and pager 256, respectively.

Fields common to the profiles of FIGS. 3A–3D are a device address field, such as a mobile identification number (MIN) field for storing the ten digit telephone number associated with a wireless communication device, an electronic serial number (ESN) field for storing the ESN unique to the wireless communication device, a location field for storing the present location of the wireless communication device, a TCM field for identifying the type of the device (e.g., voice, data, video), a device characteristics field, an SCM field, and a billing information field. The device address field could be an Internet Protocol (IP) address field, rather than a MIN field.

The device characteristics field represents one of a plurality of predetermined sets of capabilities for a type of device as specified in the TCM field, such as receive only (e.g., a pager), transmit only (e.g., a telemetry device) or transmit/receive (e.g., a voice or video telephone or modem), a maximum size message (if any) and so on. Messaging devices such as pagers may use short message service (SMS), as defined in, for example, IS 136. The specification for the IS 136 Revision A protocol, approved for publication in February 1996, is available from the Telecommunications Industry Association, 2500 Wilson Boulevard, Arlington, Va. 22201. In some embodiments, the device characteristics field is part of the TCM field.

The SCM field determines which of several types of services is associated with the wireless communication device. For example, the SCM field may specify whether the communication service is circuit switched, and at what data rate; whether the service is packet switched, and at what Internet protocol (IP) address; the type of voice quality, such as full rate voice (8 kbps), basic rate voice (4 kbps), or high quality rate voice (16 kbps); the type of service quality, such as a bit error rate (BER) of $10^{-3}$ or $10^{-6}$; or whether the service type is wireless multimedia. Multimedia refers to a message which includes one or more of voice, data and video information. Taken together, the TCM field and the SCM field determine the size of the profile. In some embodiments, the TCM field and the SCM field are combined into one field.

Generally, voice service is assumed to require real time transmission of its signals, whereas data service is assumed to be able to tolerate delays of up to a predetermined amount in the transmission of its signals. As seen in FIG. 3C, profile 350 which includes TCM field 358 specifying "data" also includes polling frequency field 364 for representing a polling frequency corresponding to the predetermined amount of delay tolerable for communication to and from wireless dataphone 254. A fixed polling frequency allows a device which is not otherwise in use to be in a severely reduced power usage or "full sleep" mode between polls. In contrast, a device which may be polled at any time can be in, at most, a somewhat reduced power usage or "sleep" mode as it must always be alert for polls. Furthermore, a device which can tolerate longer delays can be polled at longer intervals than a device requiring less delayed service, corresponding to lower power usage.

Profile 300 associated with full service wireless telephone 250 is seen to include 11 enhanced communication feature fields 314, 316 and 318 for representing enhanced communication feature information, such as a forwarding telephone number chosen for a call forwarding feature, voice messaging, three way conferencing enablement and so on.

Profile 325 associated with basic service wireless telephone 252 is devoid of enhanced communication feature fields, and so is shorter than profile 300, corresponding to reduced storage and communication resource usage for basic wireless service. Generally, basic wireless service is POTS, and may be in one of several rates, such as 4, 8 or 16 kbps.

Profile 350 associated with wireless dataphone 254 is seen to include service class 362 having a value "low" corresponding to the delay tolerance of wireless dataphone 254. In particular, the service class of "low" indicates that communication for wireless dataphone 254 can be delayed. In contrast, communication for voice telephones 250, 252 cannot be delayed. Profile 350 also includes enhanced communication feature fields 368, 370, 372 for representing enhanced communication feature information, such as whether a particular service is circuit switched or packet switched, the speed and priority level of the service and so on.

Profile 375 associated with pager 256 is short. Directional field 390 of profile 375 indicates whether communication is one-way, i.e., pager 256 is a receive only device, or two way. For a one-way device, characteristics field 392 indicates whether the communication is numeric only or may be alphanumeric. For a two-way device, characteristics field 392 indicates, for example, whether the messages from pager 256 are of fixed or variable length. Communications service for pager 256 is assumed to be provided on a fixed billing rate per billing interval rather than on usage based billing. Consequently, billing field 394 of profile 375 is short as per call billing information need not be maintained during the billing interval.

MSC 200 assigns wireless communication network resources to assigned to wireless communication devices based on the type of device and the type of service required, as specified in the profile for the device, in particular, the travelling class mark.

For example, when the device is pager 256, MSC 200 does not assign a voice channel or voice mail to the device. As another example, if a service for a device is circuit switched, then MSC 200 assigns a voice channel to the device; whereas if a service for a device is packet switched, MSC 200 does not assign a permanent voice channel to the device. As a further example, if a service for a device is multimedia, then MSC 200 assigns multiple voice channel sufficient to provide a video channel to the device.

Other portions of the wireless communication network also assign resources to a device based on its type and required service. For example, message center 500 determines how to store a message and how to communicate with a device retrieving a stored message based on the profile of the device. In particular, when message center 500 provides voice mailboxes, the voice quality rate (4, 8 or 16 kbps) determines not only the rate of supplying messages to and from storage, but also may determine the amount of compression applied before storing a voice message.

Assigning network resources based on the profile for the device is also helpful in fraud prevention. If a pager number is stolen, the amount of network resources which can be improperly used is inherently limited. For example, one-way pagers cannot place telephone calls, so a stolen pager number cannot be used to place telephone calls, but only to receive pager messages.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for managing network resources associated with a wireless communication network, comprising the steps of:

ascertaining, for a wireless communication device associated with a profile including a travelling class mark and a service class mark, a device type selected from a plurality of device types in accordance with the travelling class mark and a required service in accordance with the service class mark; and assigning the network resources to the wireless communication device in accordance with the device type and the required service.

2. The method of claim 1, wherein a profile is associated with the wireless communication device, and the profile includes a travelling class mark field which identifies the device type of the wireless communication device.

3. The method of claim 2, wherein the profile includes a service class mark field which identifies the required service for the wireless communication device.

4. The method of claim 1, wherein the step of assigning the network resources includes supplying a message stored in a mailbox at a rate depending on the required service.

5. A method for managing resources in a wireless communication network, comprising the steps of:

storing a profile including a travelling class mark and a service class mark for a wireless communication device in a service control point; and providing the profile for the wireless communication device in response to a profile request from a mobile service center.

6. The method of claim 5, wherein the wireless communication device is one of a plurality of types of wireless communication devices, and the service control point is configured so that profiles for the same type of wireless communication device are stored together.

7. The method of claim 5, wherein the wireless communication device is one of a plurality of types of wireless communication devices, and the profile is one of a plurality of types of profiles, the type of profile corresponding to the type of wireless communication device.

8. The method of claim 7, wherein the profile includes a travelling class mark identifying the type of the wireless communication device.

9. The method of claim 8, wherein the travelling class mark indicates whether the wireless communication device is a data device, a voice device or a multimedia device.

10. The method of claim 9, further comprising the step of storing a polling frequency in the profile data record when the travelling class mark indicates that the wireless communication device is a data device.

11. The method of claim 8, further comprising the step of storing billing information in the profile data record, the length of the billing information depending on the value of the travelling class mark.

12. The method of claim 7, wherein the profile includes a service class mark identifying the type of service available to the wireless communication device.

13. A service control point for managing resources in a wireless communication network, comprising:

a storage for storing a profile including a travelling class mark and a service class mark for a wireless communication device in a service control point; and an interface for providing the profile for the wireless communication device in response to a profile request from a mobile service center.

14. The service control point of claim 13, wherein the wireless communication device is one of a plurality of types of wireless communication devices, and the storage is configured so that profiles for the same type of wireless communication device are stored together.

15. The service control point of claim 13, wherein the wireless communication device is one of a plurality of types of wireless communication devices, and the profile is one of a plurality of types of profiles, the type of profile corresponding to the type of wireless communication device.

16. The service control point of claim 15, wherein the profile includes a travelling class mark identifying the type of the wireless communication device.

17. The service control point of claim 15, wherein the profile includes a service class mark identifying the type of service available to the wireless communication device.

18. A method for a mobile service center (MSC) to obtain information about a wireless communication device and wireless communication service for the wireless communication device, comprising the steps of:

determining that the wireless communication device is in the area served by the MSC, and requesting, via a communication network, a profile including a travelling class mark and a service class mark for the wireless communication device from a service control point which permanently stores the profile, wherein the MSC lacks profiles for wireless communication devices permanently associated therewith.

19. The method of claim 18, wherein there are a plurality of service control points, and further comprising the step of determining from which of the service control points the profile should be requested.

20. A mobile service center (MSC) for use in a wireless communication network, comprising:

an interface for requesting a profile including a travelling class mark and a service class mark for a wireless communication device from a service control point; and a location register for temporarily storing profiles received from the service control point, wherein the MSC lacks profiles for wireless communication devices permanently associated therewith, and the MSC lacks a storage for permanently storing profiles.

21. The MSC of claim 20, wherein the wireless communication network includes a plurality of service control points, and further comprising a processor for determining from which of the service control points the profile should be requested.

* * * * *